United States Patent
Tajima et al.

(10) Patent No.: US 8,529,759 B2
(45) Date of Patent: Sep. 10, 2013

(54) ELECTRIC DEIONIZED WATER PRODUCTION APPARATUS

(75) Inventors: Naoyuki Tajima, Koto-ku (JP); Koji Yamanaka, Koto-ku (JP); Hiroshi Inoue, Koto-ku (JP); Akira Nakamura, Koto-ku (JP)

(73) Assignee: Organo Corporation, Tokyo (JP)

( * ) Notice: Subject to any disclaimer, the term of this patent is extended or adjusted under 35 U.S.C. 154(b) by 1401 days.

(21) Appl. No.: 11/994,506

(22) PCT Filed: Jul. 20, 2005

(86) PCT No.: PCT/JP2005/013687
§ 371 (c)(1),
(2), (4) Date: Jan. 3, 2008

(87) PCT Pub. No.: WO2007/010627
PCT Pub. Date: Jan. 25, 2007

(65) Prior Publication Data
US 2008/0308482 A1    Dec. 18, 2008

(51) Int. Cl.
*C02F 1/469* (2006.01)
(52) U.S. Cl.
USPC ...... 210/243; 210/679; 210/748.01; 210/284; 210/500.1; 210/508; 204/193; 204/635; 204/632; 204/524; 204/536; 422/22; 422/24; 422/186.1; 502/401; 502/402
(58) Field of Classification Search
USPC ............. 210/748.01, 500.1–510.1, 263, 243, 210/282, 284, 266, 656, 679; 204/193, 632, 204/633, 524, 533, 536; 422/22, 24, 186.1; 502/401, 402
See application file for complete search history.

(56) References Cited

U.S. PATENT DOCUMENTS

| 6,200,483 | B1 * | 3/2001 | Cutler et al. | 210/685 |
| 7,033,472 | B2 | 4/2006 | Yamanaka et al. | |
| 7,201,832 | B2 | 4/2007 | Yamanaka et al. | |
| 2003/0213695 | A1 * | 11/2003 | Yamanaka et al. | 204/632 |
| 2006/0231403 | A1 * | 10/2006 | Riviello | 204/524 |

FOREIGN PATENT DOCUMENTS

| JP | 10-192717 | 7/1998 |
| JP | 2002-306976 | 10/2002 |
| JP | 2003-230886 | 8/2003 |
| JP | 2003-334560 | 11/2003 |
| JP | 2003-532520 | 11/2003 |
| WO | 02/24577 | 3/2002 |
| WO | 02/083770 | 10/2002 |

* cited by examiner

*Primary Examiner* — Joseph Drodge
*Assistant Examiner* — Cameron J Allen
(74) *Attorney, Agent, or Firm* — Oblon, Spivak, McClelland, Maier & Neustadt, L.L.P.

(57) ABSTRACT

An electric deionized water production apparatus in which a direct current field is applied to a deionizing chamber packed with an ion-exchange material such that ions to be discharged are allowed to migrate in the direction identical or opposite to the direction of the water flow in the ion-exchange material, whereby ionic impurities adsorbed in the ion-exchange material are discharged from the system, the ion-exchange material being a mixture of a monolith-shaped organic porous ion-exchange material and ion-exchange resin particles. The electric deionized water production apparatus has a simple structure that can reduce material cost, process cost, and assembly cost, capable of accelerating migration of the adsorbed ionic impurities to facilitate discharge of the adsorbed ions and free from a deflected flow due to swelling or shrinkage accompanying an ion-exchanging reaction, and from poor contact with an ion-exchange membrane.

14 Claims, 4 Drawing Sheets a    R-Na CATION-EXCHANGE RESIN PARTICLE
b    R-H CATION-EXCHANGE RESIN PARTICLE
c    R-Na CATION MONOLITH
d    R-H CATION MONOLITH

FIG. 1 a    R-Na CATION-EXCHANGE RESIN PARTICLE
b    R-H CATION-EXCHANGE RESIN PARTICLE
c    R-Na CATION MONOLITH
d    R-H CATION MONOLITH

ELECTRIC DEIONIZED WATER PRODUCTION APPARATUS

TECHNICAL FIELD

The present invention relates to an electric deionized water production apparatus used in various industries such as the semiconductor manufacturing industry, the pharmaceutical industry, the food industry, power plants, and laboratories, as well as for the manufacture of sugar solutions, juice, wine, and the like.

BACKGROUND ART

As a method for manufacturing deionized water, a method of deionizing water by causing the unprocessed water to pass through ion-exchange resin particles (hereinafter referred to simply as "ion-exchange resin") has been known. In this method, however, it is necessary to regenerate the ion-exchange resin using chemicals if the ion-exchange capacity is decreased. In order to eliminate such an operational disadvantage, an electric deionizing method which needs no regeneration whatsoever using chemicals has been established and commercially used.

This electric deionized water production apparatus has a basic structure of a deionizing chamber containing a layer of mixed ion-exchange resin as an ion-exchange material consisting of an anion-exchange resin and a cation-exchange resin, packed in a space between a cation-exchange membrane and an anion-exchange membrane. Water being processed passes through the layer of the mixed ion-exchange resin and, at the same time, a direct current is applied in the direction vertical to the flow of water being processed via both ion-exchange membranes to electrically remove ions in the water being processed flowing out of both ion-exchange membranes, thereby manufacturing deionized water.

JP-A-2003-334560 discloses an electric deionized water production apparatus having a deionizing chamber packed with a monolith-shaped organic porous ion-exchange material (hereinafter referred to from time to time as "monolith"). Unprocessed water is caused to pass through the deionizing chamber to remove ionic impurities therefrom, thereby producing deionized water. At the same time, a DC electric field is applied to the deionizing chamber to discharge ionic impurities adsorbed in the organic porous ion-exchange material outside of the system, wherein the DC electric field is applied so that the ions to be discharged may migrate in the direction reverse to the flow of water through the organic porous ion-exchange material. Because the electric deionized water production apparatus of JP-A-2003-334560 has a deionizing chamber with a large width and employs a monolith having a three-dimensional network structure as a packing material for deionizing chambers, the structure of the apparatus can be simplified and the costs for the materials, processing, and assembly can be reduced, as compared with the electric deionized water production apparatus in which a DC current is applied in the direction perpendicular to the direction of water being processed. In addition, since the monolith has a continuous structure throughout all the packed layers as compared with the ion-exchange resin particles, the monolith can easily adsorb and desorb ions, and accelerates transfer of adsorbed ionic impurities, thereby easily discharging the adsorbed ions. Thus, the monolith has an outstanding effect of being completely free from production of scale of calcium carbonate, magnesium hydroxide, and the like.
(Patent Document 1) JP-A-2003-334560

However, since only the monolith is filled in the deionizing chamber in the electric deionized water production apparatus of JP-A-2003-334560, the electric deionized water production apparatus has problems such as a small ion-exchange capacity and poor capability of accommodating itself to fluctuation in quality of the water being processed. In addition, the same as in the case of the ion-exchange resin particles, the monolith has a problem that the packing conditions change due to swelling and shrinking accompanying ion-exchange reactions when the chamber is packed with only a single type of ion-exchange material.

The mechanism of swelling and shrinking of the material packed in a container will be explained taking an ion-exchange resin as an example. The swelling rate of a cation-exchange resin is 7%, and the swelling rate of an anion-exchange resin is 23%, for example. The swelling rate refers to a rate of volume change when the form of an ion-exchange resin changes from a salt form to a regenerated form. For example, when a cell with a volume of 160 ml is packed with 160 ml of a regenerated-form (R—OH) anion-exchange resin and unprocessed water is caused to flow through the cell for a prescribed period of time, the form of the anion-exchange resin changes from the regenerated-form of R—OH to a salt-form of R—Cl, R—$NO_3$, R—$HCO_3$, and the like, and 160 ml of the volume of the anion-exchange resin decreases about 30% calculated as 160 ml/1.23=130.1 ml. As a result, some areas are produced in the deionizing chamber in which the resin is not filled, but only water flows. This causes a deflected flow of water, which results in an undue increase in voltage and ultimately makes it impossible to obtain a current flow required for removal of ions. On the contrary, when a cell with a volume of 160 ml is packed with 160 ml of a salt-form anion-exchange resin such as R—Cl, R—$NO_3$, R—$HCO_3$, and the like, and unprocessed water is caused to flow through the cell for a prescribed period of time, the anion-exchange resin changes into a regenerated-form of R—OH. As a result, a force to increase the volume of the anion-exchange resin from 160 ml to the volume calculated to be 160 ml×1.23=196.8 ml, is created. In this case, however, since there is a container for the deionizing chamber, problems such as breakage of the container due to concentration of force in the area in which the strength is the lowest in the deionizing chamber and an increase in the resistance to water flow occur. The monolith has the same characteristics to swell and shrink, and is subjected to approximately the same degree of volume change. In order to solve such problems of swelling and shrinking of an ion-exchange material, a method of previously determining the volume ratio of the salt form and regenerated form of the ion-exchange material to be filled in the deionizing chamber can be considered. However, it is impossible to determine the volume ratio before filling because the ratio of the salt form and regenerated form in the deionizing chamber varies according to the quality of the unprocessed water and the current efficiency in continuous operation of an electric deionized water production apparatus. Under such a situation, development of an electric deionized water production apparatus in which the problem of deflected flow and poor contact with the ion-exchange membrane caused by the swelling and shrinking of an ion-exchange reaction can be solved, while maintaining the advantageous features of the electric deionized water production apparatus using monolith described in JP-A-2003-334560, has been desired.

Therefore, an object of the present invention is to provide an electric deionized water production apparatus having a simple structure which can reduce material cost, process cost, and assembly cost, capable of accelerating migration of the adsorbed ionic impurities to facilitate discharge of the adsorbed ions and free from a deflected flow due to swelling or shrinkage accompanying an ion-exchanging reaction, and from poor contact with an ion-exchange membrane.

DISCLOSURE OF THE INVENTION

In view of this situation, the inventors of the present invention have conducted extensive studies with an objective of solving the above problems with a general electric deionized water production apparatus. As a result, the inventors have found that, if a mixture of a monolith and an ion-exchange resin is filled in an deionizing chamber, deflected flow and poor contact with an ion-exchange membrane due to swelling or shrinkage accompanying an ion-exchanging reaction can be prevented by a buffer action due to physical elasticity of the monolith unrelated to the swelling and shrinking caused by the ion-exchanging reaction, and that it is possible to provide a deionizing chamber with a simple and wide structure which could not be attained by using a single ion-exchange material, and to reduce the costs for materials, processing, and assembly.

Specifically, an invention (1) provides an electric deionized water production apparatus in which a direct current field is applied to a deionizing chamber packed with an ion-exchange material in such a manner that ions to be discharged are allowed to migrate in the direction identical or opposite to the direction of the water flow in the ion-exchange material, whereby ionic impurities adsorbed in the ion-exchange material are discharged from the system, the ion-exchange material being a mixture of a monolith-shaped organic porous ion-exchange material and ion-exchange resin particles.

An invention (2) provides an electric deionized water production apparatus comprising: an anion cell which has a deanionizing chamber partitioned by an anion-exchange membrane on one side and an ion-exchange membrane on the other side, an anode disposed outside of the anion-exchange membrane on one side, and a cathode disposed outside of the ion-exchange membrane on the other side, to supply unprocessed water from the neighborhood of the anion-exchange membrane on one side of the deanionizing chamber to obtain a first processed-water from the neighborhood of the ion-exchange membrane on the other side of the deanionizing chamber; and a cation cell which has a decationizing chamber partitioned by a cation-exchange membrane on one side and an ion-exchange membrane on the other side, a cathode disposed outside of the cation-exchange membrane on one side, and an anode disposed outside of the ion-exchange membrane on the other side, to supply the first-processed water from the neighborhood of the cation-exchange membrane on one side of the decationizing chamber to obtain a second processed-water from the neighborhood of the ion-exchange membrane on the other side of the decationizing chamber.

An invention (3) provides an electric deionized water production apparatus comprising: a cation cell which has a decationizing chamber partitioned by a cation-exchange membrane on one side and an ion-exchange membrane on the other side, a cathode disposed outside of the cation-exchange membrane on one side, and an anode disposed outside of the ion-exchange membrane on the other side, to supply unprocessed water from the neighborhood of the cation-exchange membrane on one side of the decationizing chamber to obtain a first processed-water from the neighborhood of the ion-exchange membrane on the other side of the decationizing chamber; and an anion cell which has a deanionizing chamber partitioned by an anion-exchange membrane on one side and an ion-exchange membrane on the other side, an anode disposed outside of the anion-exchange membrane on one side, and a cathode disposed outside of the ion-exchange membrane on the other side, to supply the first-processed water from the neighborhood of the anion-exchange membrane on one side of the deanionizing chamber to obtain a second processed-water from the neighborhood of the ion-exchange membrane on the other side of the deanionizing chamber.

An invention (4) provides the electric deionized water production apparatus according to the above inventions, wherein the ion-exchange material packed in the cathode side of the above cation cell is a monolith-shaped organic porous cation-exchange material or the ion-exchange material packed in the anode side is a monolith-shaped organic porous anion-exchange material, and the ion-exchange material packed in the anode side of the above anion cell is a monolith-shaped organic porous anion-exchange material or the ion-exchange material packed in the cathode side is a monolith-shaped organic porous cation-exchange material.

An invention (5) provides the electric deionized water production apparatus according to the above-described inventions, provided with an intermediate ion-exchange membrane between the anion-exchange membrane on one side and the cation-exchange membrane on the other side, to form a deanionizing chamber partitioned by the anion-exchange membrane on one side and the intermediate ion-exchange membrane and a decationizing chamber partitioned by the cation-exchange membrane on the other side and the intermediate ion-exchange membrane, an anode being disposed outside of the anion-exchange membrane on one side and a cathode being disposed outside of the cation-exchange membrane on the other side, wherein unprocessed water is supplied from the neighborhood of the cation-exchange membrane on the other side of the decationizing chamber to obtain a first processed-water from the neighborhood of the intermediate ion-exchange membrane in the decationizing chamber, and the first processed-water is supplied from the neighborhood of the anion-exchange membrane on one side of the deanionizing chamber to obtain a second processed-water from the neighborhood of the intermediate ion-exchange membrane in the deanionizing chamber.

An invention (6) provides the electric deionized water production apparatus according to the above-described inventions, provided with an intermediate ion-exchange membrane between the cation-exchange membrane on one side and the anion-exchange membrane on the other side, to form a decationizing chamber partitioned by the cation-exchange membrane on one side and the intermediate ion-exchange membrane and a deanionizing chamber partitioned by the anion-exchange membrane on the other side and the intermediate ion-exchange membrane, and a cathode being disposed outside of the cation-exchange membrane on one side and an anode being disposed outside of the anion-exchange membrane on the other side, wherein unprocessed water is supplied from the neighborhood of the anion-exchange membrane on the other side of the deanionizing chamber to obtain a first processed-water from the neighborhood of the intermediate ion-exchange membrane in the deanionizing chamber, and the first processed-water is supplied from the neighborhood of the cation-exchange membrane on one side of the decationizing chamber to obtain a second processed-water from the neighborhood of the intermediate ion-exchange membrane in the decationizing chamber.

An invention (7) provides the electric deionized water production apparatus according to the above inventions, wherein the ion-exchange material packed in the cathode side of the above decationizing chamber is a monolith-shaped organic porous cation-exchange material or the ion-exchange material packed in the anode side of the deanionizing chamber is a monolith-shaped organic porous anion-exchange material.

An invention (8) provides the electric deionized water production apparatus according to the above inventions, which has a deionizing chamber partitioned by an anion-exchange membrane on one side and a cation-exchange membrane on the other side, an anode disposed outside of the anion-exchange membrane on one side, and a cathode disposed outside of the cation-exchange membrane on the other side, the anode side of the deionizing chamber being packed with a monolith-shaped organic porous anion-exchange material, or the cathode side of the deionizing chamber being packed with a monolith-shaped organic porous cation-exchange material, wherein unprocessed water is supplied from the neighborhood of the anion-exchange membrane on one side of the deionizing chamber to obtain a processed water from the neighborhood of the cation-exchange membrane on the other side of the deionizing chamber, or from the neighborhood of the cation-exchange membrane on the other side of the deionizing chamber to obtain a processed water from the neighborhood of the anion-exchange membrane on one side of the deionizing chamber.

Since the monolith is used as a part of the ion-exchange material packed in the deionizing chamber of the present invention, the volume change caused by a swelling or shrinkage reaction of the monolith and an ion-exchange resin can be buffered by physical elasticity of the monolith, whereby uniform packing conditions of the deionizing chamber can be maintained. In addition, since a deflected flow due to swelling or shrinkage accompanying an ion-exchanging reaction and poor contact with an ion-exchange membrane can be prevented, it is possible to form a simplified deionizing exchange chamber structure having a wide space which has not been achieved by using a single type of ion-exchange resin, and to reduce material cost, process cost, and assembly cost. In addition, because the monolith allows ions to move faster therein than in an ion-exchange resin and has a shorter ion-exchange length as compared with an ion-exchange resin, the monolith disposed near the inlet port of unprocessed water accelerates discharge of ions, making it possible to process water with a high ion concentration, and the monolith disposed near the outlet port of processed water can inhibit escape of a trace amount of ions in a low concentration area, making it possible to obtain high purity processed water. Moreover, it is possible to increase the rate of elimination of hard components such as calcium in the decationizing chamber and to increase the rate of elimination of anions such as carbonic acid and silica in the deanionizing chamber by disposing the monolith near the inlet port of the unprocessed water of the deionizing chamber. Furthermore, a water flow resistance is smaller by far in an ion-exchange-resin phase than in a monolith phase, and the ion-exchange resin phase disposed near the inlet port of the unprocessed water functions as if a distribution tube forms a uniform flow in the deionizing chamber, thereby preventing a deflected flow in the deionizing chamber. The deflected flow can be prevented more effectively if an ion-exchange resin phase is disposed near the outlet port of the processed water.

BEST MODE FOR CARRYING OUT THE INVENTION

Figure 2:
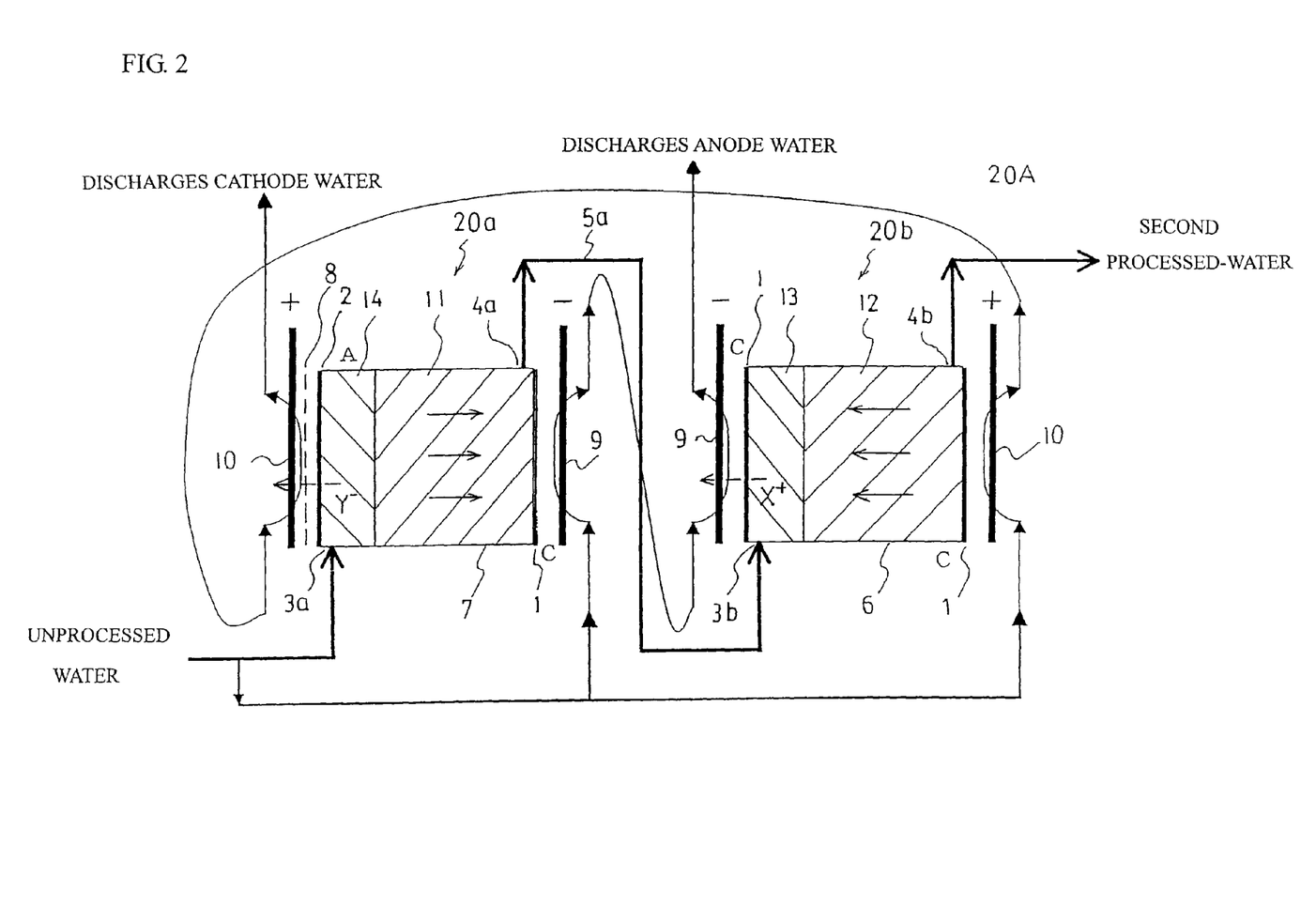
FIG. 2 is a schematic drawing showing a first embodiment of the electric deionized water production apparatus of the present invention.

The electric deionized water production apparatus of the present invention has a basic structure, in which a deionizing chamber partitioned by ion-exchange membranes on both sides is packed with a mixture of a monolith and an ion-exchange resin, and electrodes are disposed outside of the ion-exchange membranes to apply a DC electric field in the direction so that the ions discharged may migrate to the direction identical or opposite to the direction in which water flows. The term "migrate to the direction identical or opposite" includes the case in which the ions migrate to both the identical and opposite directions. The water flow direction in the composite ion-exchange materials in the present invention means the water flow direction around the center of the composite ion-exchange materials. As shown in FIG. 2, for example, the inlet port of the unprocessed water and the outlet port of the processed water are approximately on a diagonal line viewed from the side. Although the water does not necessarily flow in one direction in the composite ion-exchange materials, that is, not in the right and left directions as shown in the drawing, a major amount of water flows in the composite ion-exchange materials approximately in the right and left directions in practice. Although it is not necessary to install a feed water distribution section and a processed water collecting section within the composite ion-exchange materials, the composite ion-exchange materials may be provided with such sections.

There are no particular limitations to the monolith-shaped organic porous ion-exchange material. The material described in JP-A-2003-334560 can be given as an example. A material having a continuous pore structure comprising interconnected macropores and mesopores with an average diameter of 1 to 1,000 μm in the walls of the macropores and a three-dimensional network structure, which has a total pore volume of 1 to 50 ml/g, uniformly distributed ion-exchange groups, and an ion-exchange capacity of 0.5 mg-equivalence/g or more on a dry basis, can be used. There are no specific limitations to the ion-exchange resin particles. Ion-exchange resins commonly used in water treatment processes can be given.

There are no specific limitations to the type of the mixture of monolith and ion-exchange resin. A laminate in which the monolith phase and the ion-exchange-resin phase are laminated in the water flow direction (the direction in which discharge ions migrate) can be given. Since the monolith is a sponge-like integral structural object, the monolith is not mixed with the ion-exchange resin in the laminate of the monolith and the ion-exchange-resin. Thus, the laminate of the monolith and the ion-exchange-resin can be packed to form separate phases in the container without using a parting means such as an ion-exchange membrane. There are no specific limitations to the volume ratio of the monolith phase to the ion-exchange resin phase in the laminate. Such a ratio can be appropriately selected according to the type of ion-exchange and the purpose of water processing. There are no specific limitations to the structure of the laminate. A twolayer structure consisting of a combination of a monolith phase/ion-exchange resin phase and a combination of an ion-exchange resin phase/monolith phase arranged from the ion-exchange membrane on one side to the ion-exchange membrane on the other side; a three-layer structure consisting of a combination of a monolith phase/ion-exchange resin phase/monolith phase and a combination of an ion-exchange resin phase/monolith phase/ion-exchange resin phase; a four-layer structure consisting of a repetition of a monolith phase and an ion-exchange resin phase; and the like can be given. Among these, the structure in which the monolith phase is disposed near the inlet port of unprocessed water can increase the discharge rate of hard components such as calcium ion in the decationizing chamber and the discharge rate of anions such as carbonic acid and silica in the deanionizing chamber. The structure in which a cationic monolith is disposed near the outlet port of processed water can ensure elimination of a very small amount of cation, which has not been eliminated in the decationizing chamber, in the deanionizing chamber. In the structure in which an ion-exchange resin is disposed near the inlet port of the unprocessed water or both near the inlet port of the unprocessed water and near the outlet port of processed water, since the water flow resistance is smaller by far in an ion-exchange-resin phase than in a monolith phase, the ion-exchange resin phase disposed near the inlet port of the water functions as if a distribution tube forms a uniform flow in the deionizing chamber, thereby preventing deflected flow in the deionizing chamber.

Figure 1:
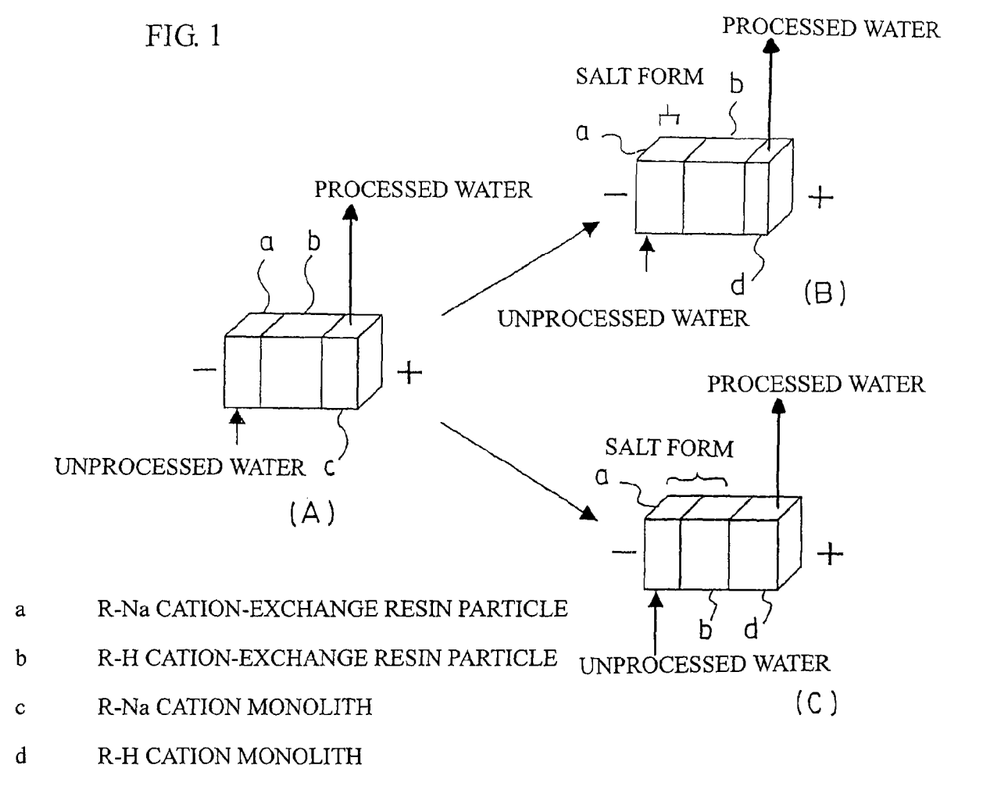
FIG. 1 is a drawing to explain swelling and shrinking of a mixture of monolith and ion-exchange resin.

There are no specific limitations to the ionic type of the mixture of the monolith and ion-exchange resin. A mixture of a salt type and a regenerated type is preferable for reducing the degree of swelling and shrinking accompanying an ion-exchange reaction. The swelling and shrinking reducing effect due to the mixture of the monolith and ion-exchange resin alone is not sufficient in the present invention. Adhesiveness in the deionizing chamber can be ensured by a combination of this effect and a physical elastic effect of the monolith. The swelling and shrinking reducing of the mixture of the monolith and ion-exchange resin will be explained taking a cation cell as an example. The cation cell shown in FIG. 1(A) is packed with 40 ml of R—Na cation-exchange resin particles (cross-sectional 4×5=20 cm², length between electrodes: 2 cm), 80 ml of R—H cation-exchange resin particles (cross-sectional 4×5=20 cm², length between electrodes: 4 cm), and 40 ml of R—Na cation monolith in that order from the cathode side to the anode side 40 ml (cross-sectional 4×5=20 cm, length between electrodes: 2 cm). When this cation cell is subjected to continuous water processing and regeneration, the R—Na cation-exchange resin particles are partly regenerated and swell, the R—H cation-exchange resin particles do not change, and the R—Na cation monolith are regenerated and swell. In this instance, although the cation monolith regenerated from R—Na to R—H swells, the monolith is crushed into a sponge-like (concave) form and absorbs the expansion of the R—Na cation-exchange resin particles. Therefore, ion-exchange material is provided with increased closeness and is in an excellently balanced packed condition in the container (FIG. 1(B)). On the other hand, in the case where continuous water processing/regeneration is carried out in the cation cell, when unprocessed water has a high ion charge and the cation cell is brought to an ion accumulation state of a higher concentration than the initial packed state, the length of the ion-exchange material is extended from the inlet port side of the unprocessed water (cathode side, ion discharge side) to the outlet port side of processed water (anode side, regeneration side). In this case, the R—Na cation-exchange resin particles do not change, but the R—H cation-exchange resin particles partly change into a salt form and shrink, and the R—Na cation monolith is regenerated and swells. In this instance, the cation monolith regenerated from R—Na to R—H swells and absorbs the expansion of the R—H cation-exchange resin particles. Therefore, ion-exchange materials are provided with increased adhesiveness and are in an excellently balanced packed condition in the container (FIG. 1(C)). Although the cation cell was explained taking the case in which the R—Na cation-exchange resin and the R—H cation-exchange resin are packed in layers as an example, the form of the cation cell is not limited to this example. A mixture of cation-exchange resins may be used and exhibits the same effect.

In the present invention, the "unprocessed water" can be any water inasmuch as the water is to be processed for deionization and does not contain cloudy materials. Examples include industrial water and tap water with turbidity of about 1 or less.

A first embodiment of the electric deionized water production apparatus of the present invention will now be explained with reference to FIG. 2. FIG. 2 is a schematic drawing describing the structure of the electric deionized water production apparatus of this embodiment. An electric deionized water production apparatus 20A of FIG. 2 consists of an anion cell 20a of which the major function is to remove anionic impurities from the unprocessed water and a cation cell 20b of which the major function is to remove cationic impurities from the processed water discharged from the anion cell 20a.

The anion cell 20a comprises a deanionizing chamber 7, having a deionizing chamber partitioned by an anion-exchange membrane 2 on one side and a cation-exchange membrane 1 on the other side, which is packed with an anion monolith 14 and an anion-exchange resin 11 in that order from the side of the anion-exchange membrane 2 on one side, an anode 10 disposed outside of the anion-exchange membrane 2 on one side, and a cathode 9 disposed outside of the cation-exchange membrane 1 on the other side, in which unprocessed water is supplied from an inlet port 3a near the anion-exchange membrane 2 on one side (anode side) of the deanionizing chamber 7 to obtain first processed water from an outlet port 4a near the cation-exchange membrane 1 on the other side (cathode side). Specifically, the water flows in the deanionizing chamber 7 of the anion cell 20a from left to right, as shown by solid arrows in FIG. 2. The packing ratio of the anion monolith 14 and the anion-exchange resin 11 can be arbitrarily determined according to the properties of the unprocessed water and the like. A preferable range of the ratio by volume of monolith:ion-exchange resin is from 1:0.5 to 1:10.

On the other hand, the cation cell 20b comprises a decationizing chamber 6, having a deionizing chamber partitioned by a cation-exchange membrane 1 on one side and another cation-exchange membrane 1 on the other side, which is packed with an cation monolith 13 and a cation-exchange resin 12 in that order from the side of the cation-exchange membrane 1 on one side, a cathode 9 disposed outside of the cation-exchange membrane 1 on one side, and an anode 10 disposed outside of the cation-exchange membrane 1 on the other side, in which processed water (first processed water) which was processed in the anion cell 20a is supplied from an inlet port 3b near the cation-exchange membrane 1 on one side (cathode side) of the decationizing chamber 6 to obtain processed water (second processed water) from an outlet port 4b near the cation-exchange membrane 1 on the other side (anode side). Specifically, the water flows in the decationizing chamber 6 of the cation cell 20b from left to right, as shown by solid arrows in FIG. 1. The packing ratio of the cation monolith 13 and the cation-exchange resin 12 can be arbitrarily determined according to the properties of the unprocessed water and the like. A preferable range of the ratio by volume of monolith:ion-exchange resin is from 1:0.5 to 1:10.

The above-mentioned monolith-shaped organic porous ion-exchange material is suitable as the anion monolith 14 which is packed in the deanionizing chamber 7 of the anion cell 20a and the cation monolith 13 which is packed in the decationizing chamber 6 of the cation cell 20b. There are no specific limitations to the configuration of the decationizing chamber 6 and deanionizing chamber 7 inasmuch as an electric field can be applied to enable ions to be discharged to electrophoretically migrate in the reverse direction of the water flow in the mixed ion-exchange material. Cylinder and cuboid, for example, are preferable configurations from the viewpoint of ease of fabrication. The distance which the unprocessed water moves, specifically, the effective thickness of the mixed ion-exchange material layers forming the decationizing chamber 6 and deanionizing chamber 7 is 20 to 600 mm, and preferably 30 to 300 mm, for ensuring deionizing treatment while controlling the values of electric resistance and the pressure difference of water permeation.

Description of JP-A-2003-334560 may be followed as to the cation-exchange membrane, anion-exchange membrane, cathode, anode, the arrangement of the electrodes and ion-exchange membranes, the arrangement of a direct current, the direct current conducting method, and the like. In the anion cell 20a, in order to avoid direct contact of the anode and the anion-exchange membrane, a nonconductive spacer 8 such as a mesh made from polyolefin is provided between them. This arrangement can prevent degradation of the anion-exchange membrane due to a strong oxidation effect on the anode side.

There are no specific limitations to the method for introducing unprocessed water into the mixed ion-exchange material and the method for collecting the processed water from the mixed ion-exchange material in the anion cell 20a and the cation cell 20b. It is possible to introduce the unprocessed water discharge the processed water from the inlet port or the outlet port which are respectively provided near the ion-exchange membrane of the container in which the mixed ion-exchange materials are packed. It is also possible to employ a system of embedding distribution pipes and water-collecting pipes with small holes (pores) in the ion-exchange material in the form of concentric circles or equally-spaced parallel lines conforming to the configuration of the deionizing chamber to allow a uniform flow of unprocessed water in the deionizing chamber, or a system of forming grooves in the processed water collecting sections and the first processed water introduction-distribution sections in the monolith so that the monolith itself may be provided with the functions of collecting processed water and distributing the unprocessed water, for example.

Either continuous or intermittent operation can be applied to the electric deionized water production apparatus 20A of the embodiment. The continuous operation may comprise, for example, continuous feeding of the unprocessed water and continuous current charge. In the intermittent operation, feeding of the unprocessed water is suspended for a certain period of time. The direct current may be caused to run only during the period of time in which feeding of the unprocessed water is suspended.

In the anion cell 20a, the unprocessed water is introduced from the inlet port 3a near the anion-exchange membrane 2 of the anode 10 side of the deanionizing chamber 7. Then, the unprocessed water moves to the cathode 9 side during which anions $Y^-$ are removed by adsorption in the anion monolith 14 and anion-exchange resin 11, and is discharged from the outlet port 4a near the cation-exchange membrane 1 on the cathode 9 side of the deanionizing chamber 7 as the first processed water. Next, the first processed water is introduced near the cation-exchange membrane 1 of the cathode 9 side in the decationizing chamber 6 of the cation cell 20b via a connecting pipe 5a and the inlet port 3b. Then, the first processed water moves to the anode 10 side during which cations $X^+$ are removed by adsorption in the cation monolith 13 and the cation-exchange resin 12, and discharged from the outlet port 4 near the cation-exchange membrane 1 on the anode 10 side of the decationizing chamber 6 as the second processed water.

The anions $Y^-$ adsorbed in the anion monolith 14 and the anion-exchange resin 11 in the deanionizing chamber 7 electrophoretically migrate by the direct current running between the cathode 9 and anode 10 disposed on the both sides of the deanionizing chamber 7, pass through the anion-exchange membrane 2 on the anode 10 side, and are discharged to an anode chamber (not shown). In the same way, the cations $X^+$ adsorbed in the cation monolith 13 and the cation-exchange resin 12 in the decationizing chamber 6 electrophoretically migrate by the direct current running between the cathode 9 and anode 10 disposed on the both sides of the decationizing chamber 6, pass through the cation-exchange membrane 1 on the cathode 9 side, and are discharged to a cathode chamber (not shown).

Impurity anions discharged to the anode chamber are adsorbed in electrode water flowing in from an anode chamber entrance and flowing out of an anode chamber exit, and discharged from the system. In the same way, impurity cations discharged to the cathode chamber are adsorbed in electrode water flowing in from a cathode chamber entrance and flowing out from a cathode chamber exit, and discharged from the system. A part of the unprocessed water may be used as the electrode water. In this case, either the unprocessed water may be branched to independently flow through the four electrode chambers or may flow through each of the anode water system and the cathode water system. The electrode water may flow either continuously or intermittently.

The method is particularly effective when water contains a large amount of free carbonic acid, such as water penetrating a reverse osmosis membrane, for example, since the anion monolith phase disposed in the anion cell 20a near the inlet port of the unprocessed water increases the discharge rate of anions such as carbonic acid and silica. Because the monolith and the ion-exchange resin are mixed in the form of layers in the cell of this apparatus, it is possible to offset a decrease in the ion-exchange capacity due to the use of monolith. In addition, it is possible to reduce the volume change caused by a swelling or shrinkage reaction of the monolith and the ion-exchange resin by physical elasticity of the monolith, whereby uniform packing conditions of the deionizing chamber can be maintained. Since impurity cations and impurity anions are separately discharged out of the electric deionized water production apparatus of the present invention, these impurities are not mixed in the apparatus as in a common electric deionized water production apparatus. Thus, scale production in the apparatus can be prevented even if hard components such as calcium and magnesium are included in the unprocessed water.

As another method of feeding water to the electric deionized water production apparatus 20A, a method of treating the unprocessed water in the cation cell 20b, then treating the processed water from the cation cell 20b in the anion cell 20a, for example, can be given. According to this method, since water is first fed to the cation cell, in which calcium ion and magnesium ion are eliminated, it is possible to prevent scale production in the anion cell 20a. In addition, since a cation monolith phase is arranged near the inlet port of the unprocessed water in the cation cell 20b, the rate of elimination of calcium ions and magnesium ions is promoted. For this reason, this method is effective for treating water which contains hard components such as calcium and magnesium.

In the electric deionized water production apparatus 20A of this embodiment, the configuration in which the mixed ion-exchange materials are packed in the deanionizing chamber 7 include, in addition to the above-described configuration, a configuration in which an anion-exchange resin and a cation monolith are packed in that order from the anion-exchange membrane 2 on one side (anode side) to the cation-exchange membrane 1 on the other side, a configuration in which an anion monolith, an anion-exchange resin, and a cation monolith are packed in that order from the anion-exchange membrane 2 on one side (anode side) to the cation-exchange membrane 1 on the other side, and the like can be given. The type of the ion-exchange membrane on the cathode side is decided to be either a cation-exchange membrane or an anion-exchange membrane according to the type of the ion-exchange material packed near the ion-exchange membrane on the cathode side. When the anion-exchange resin and cation monolith are packed, a buffering effect brought about by physical elasticity of the cation monolith can maintain uniform packing conditions of the deanionizing chamber. In addition, along with a simple polishing function that is provided, installation of the inlet port 3a in the anion-exchange resin phase can prevent deflected flow in the deionizing chamber. When an anion monolith, an anion-exchange resin, and a cation monolith are packed in that order, not only it is possible to increase the discharge rate of anion impurities such as carbonic acid and silica, but also a simple polishing function can be provided and uniform packing conditions of the deanionizing chamber can be maintained due to physical elasticity of the both monoliths. Appropriate ion-exchange materials can be selected also for the mixed ion-exchange materials packed in the decationizing chamber 6. The method of treating the unprocessed water in the cation cell 20b, and then treating the processed water from the cation cell 20b in the anion cell 20a can also be applied to this form of arrangement.

Figure 3:
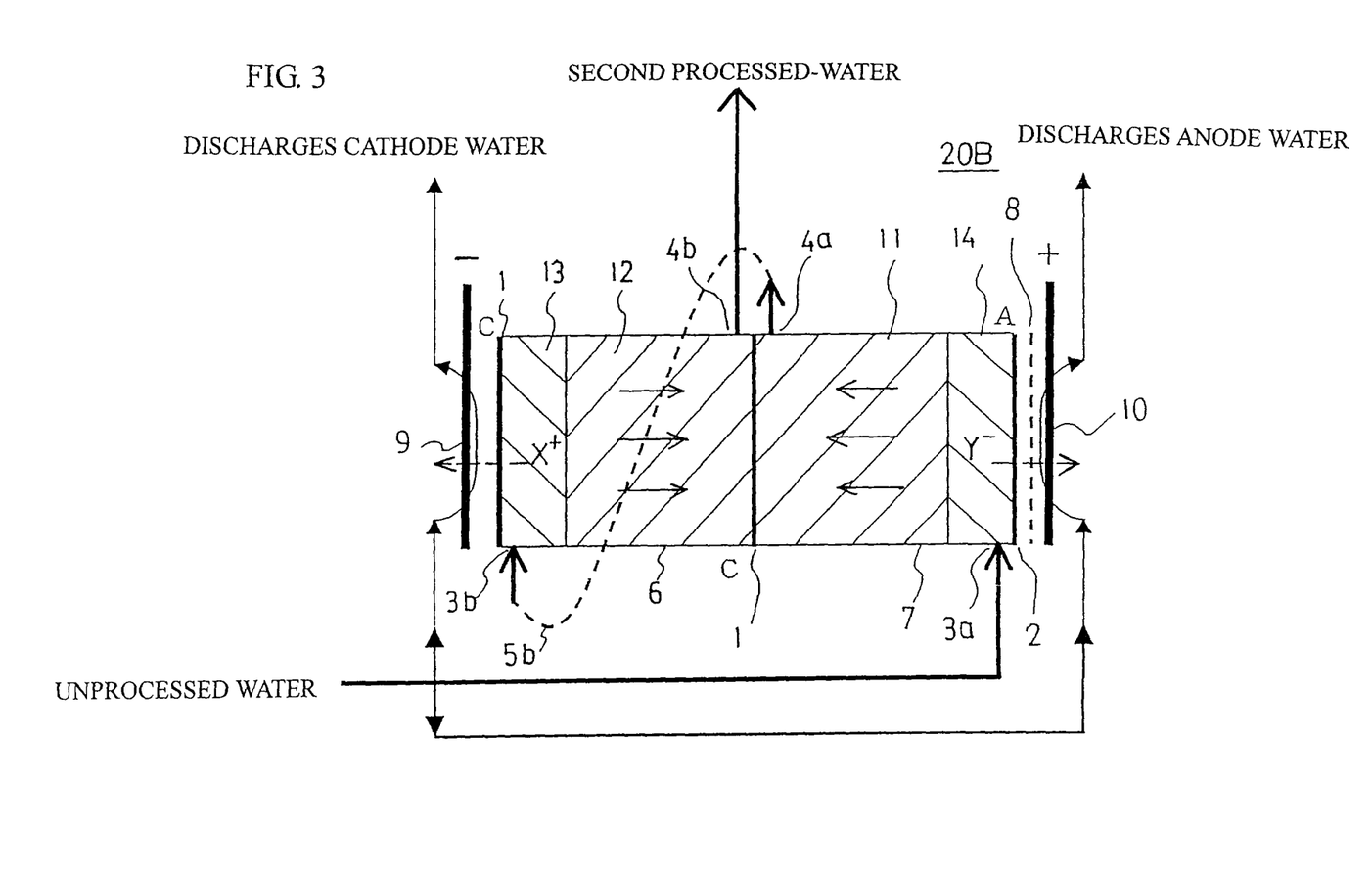
FIG. 3 is a schematic drawing showing a second embodiment of the electric deionized water production apparatus of the present invention.

Next, a second embodiment of the electric deionized water production apparatus of the present invention will be explained with reference to FIG. 3. FIG. 3 is a schematic drawing describing the structure of the electric deionized water production apparatus of the embodiment. In FIG. 3, the same symbols are given to the same components as in FIG. 2, for which the description is omitted, focusing the description on the components having different features. An electric deionized water production apparatus 20B in FIG. 3 differs from the electric deionized water production apparatus 20A in FIG. 2 in providing a decationizing chamber and a deanionizing chamber between a pair of electrodes by omitting a pair of electrodes. Specifically, the electric deionized water production apparatus 20B of the embodiment comprises a decationizing chamber 6 packed with a cation monolith 13 and a cation-exchange resin 12 in a first deionizing chamber partitioned by a cation-exchange membrane 1 on one side and an intermediate cation-exchange membrane 1 formed between the cation-exchange membrane 1 on one side and an anion-exchange membrane 2 on the other side, a deanionizing chamber 7 packed with an anion-exchange resin 11 and an anion monolith 14 in a second deionizing chamber partitioned by an anion-exchange membrane 2 on the other side and the intermediate cation-exchange membrane 1, from the intermediate cation-exchange membrane 1 side, a cathode 9 disposed outside of the cation-exchange membrane 1 on one side, an anode 10 disposed outside of the anion-exchange membrane 2 on the other side, wherein unprocessed water is supplied to an inlet port 3a near the anion-exchange membrane 2 on the other side (anode side) of the deanionizing chamber 7 to obtain a first processed water from the outlet port 4a near the intermediate cation-exchange membrane 1 of the deanionizing chamber 7, and the first processed water is supplied to an inlet port 3b near the cation-exchange membrane 1 on one side (cathode side) of the decationizing chamber 6 to obtain a second processed water from the outlet port 4b near the intermediate cation-exchange membrane 1 of the decationizing chamber 6.

In the electric deionized water production apparatus 20B, the unprocessed water supplied near the anion-exchange membrane 2 on the anode 10 side of the deanionizing chamber 7 moves to the intermediate cation-exchange membrane 1 side during which anions $Y^-$ are removed by adsorption in the anion monolith 14 and the anion-exchange resin 11, and discharged from the outlet port 4b near the intermediate cation-exchange membrane 1 of the deanionizing chamber 7 as the first processed water. Next, the first processed water is introduced in the decationizing chamber 6 from near the cation-exchange membrane 1 of the cathode 9 side of the decationizing chamber 6 via a connecting pipe 5b. Then, the first processed water moves to the intermediate cation-exchange membrane 1 side during which cations $X^+$ are removed by adsorption in the cation monolith 13 and the cation-exchange resin 12, and discharged from near the intermediate cation-exchange membrane 1 of the decationizing chamber 6 as the second processed water.

On the other hand, cations $X^+$ adsorbed in the mixed cation-exchange material in the decationizing chamber 6 are electrophoretically moved by the direct current running between the cathode 9 and anode 10 disposed on both sides of the apparatus 20B, pass through the cation-exchange membrane 1 on the cathode 9 side, and are discharged to the cathode chamber (not shown). In the same manner, anions $Y^-$ adsorbed in the mixed anion-exchange material in the deanionizing chamber 7 are electrophoretically moved by the direct current running between the cathode 9 and anode 10, pass through the anion-exchange membrane 2 on the anode 10 side, and are discharged to the anode chamber (not shown). Specifically, water flows in the deanionizing chamber 7 from right to left shown by the solid arrows in FIG. 3, and discharged anions migrate in the reverse to the direction of the water flow in the mixed ion-exchange material. On the other hand, in the decationizing chamber 6, water flows from left to right as shown by the solid arrows, and discharged cations migrate in the reverse to the direction of the water flow in the mixed ion-exchange material. The packing ratio of the monolith and the ion-exchange resin in the decationizing chamber 6 and the deanionizing chamber 7 can be arbitrarily determined according to the properties of the unprocessed water and the like. A preferable range of the ratio by volume of monolith:ion-exchange resin is from 1:0.5 to 1:10. In addition to the same effects exhibited by the electric deionized water production apparatus 20A in the first embodiment, the electric deionized water production apparatus 20B in the second embodiment has the effect of downsizing and simplifying the apparatus by omitting a pair of electrodes.

As another method of feeding water to the electric deionized water production apparatus 20B, a method of treating the unprocessed water in the decationizing chamber 6, then treating the processed water from the decationizing chamber 6 in the deanionizing chamber 7, for example, can be given. According to this method, since water is first fed to the decationizing chamber 6, in which calcium ion and magnesium ion are eliminated, it is possible to prevent scale production in the deanionizing chamber 7. In addition, since a cation monolith phase is arranged near the inlet port of the unprocessed water in the decationizing chamber 6, the rate of elimination of calcium ion and magnesium ion is promoted. For this reason, this method is effective for treating water which contains hard components such as calcium and magnesium.

In the electric deionized water production apparatus 20B of the embodiment, the configuration in which the mixed ion-exchange materials are packed in the decationizing chamber 6 include, in addition to the above-described configuration, a configuration in which a cation-exchange resin and an anion monolith are packed in that order from the cation-exchange membrane 1 on one side (cathode side) to the intermediate ion-exchange membrane 1, a configuration in which a cation monolith, a cation-exchange resin, and an anion monolith are packed in that order from the cation-exchange membrane 1 on the one side (cathode side) to the intermediate ion membrane 1, and the like can be given. The type of the intermediate ion-exchange membrane 1 is selected from a cation-exchange membrane or an anion-exchange membrane according to the type of the ion-exchange material packed near the intermediate ion-exchange membrane. When a cation-exchange resin and an anion monolith are packed, a buffering effect brought about by physical elasticity of the anion monolith can maintain uniform packing conditions of the decationizing chamber 6. In addition, along with a simple polishing function that is provided, installation of the inlet port 3b in the anion-exchange resin phase can prevent deflected flow in the deionizing chamber. When an cation monolith, an cation-exchange resin, and an anion monolith are packed in that order, not only it is possible to increase the discharge rate of impurity ions such as calcium and magnesium, but also a polishing function can be provided and uniform packing conditions of the decationizing chamber 6 can be maintained due to physical elasticity of both monoliths. Appropriate ion-exchange materials can be selected also for the mixed ion-exchange materials packed in the deanionizing chamber 7. The method of treating the unprocessed water in the decationizing chamber 6, and then treating the water from the decationizing chamber 6 in the deanionizing chamber 7 can also be applied to this form of arrangement.

Figure 4:
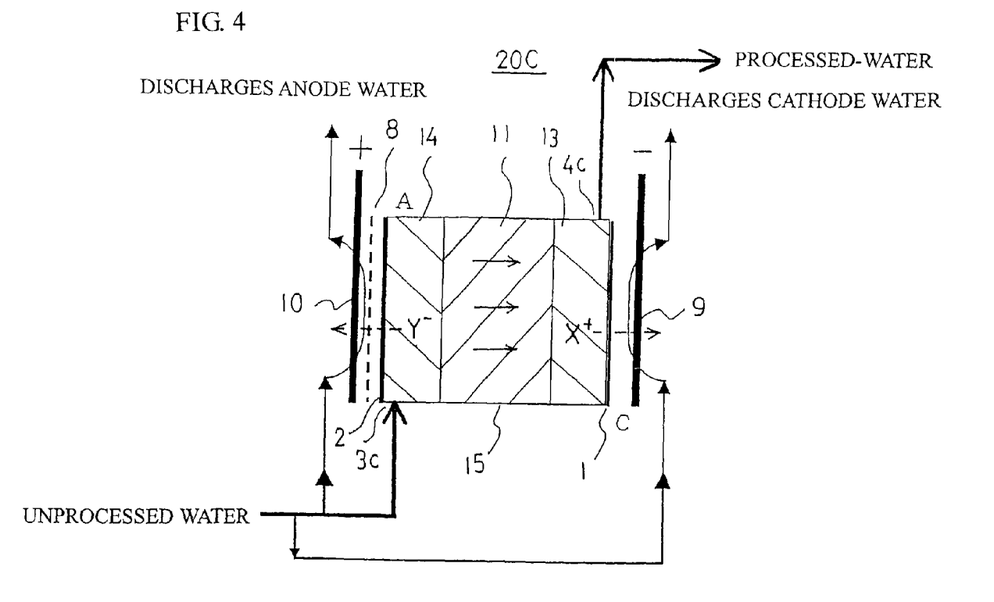
FIG. 4 is a schematic drawing showing a third embodiment of the electric deionized water production apparatus of the present invention.

Next, a third embodiment of the electric deionized water production apparatus of the present invention will be explained with reference to FIG. 4. FIG. 4 is a schematic drawing describing the structure of the electric deionized water production apparatus of the embodiment. In FIG. 4, the same symbols are given to the same components as in FIG. 3, for which the description is omitted, focusing the description on the components having different features. The electric deionized water production apparatus 20C in FIG. 4 differs from the electric deionized water production apparatus in FIG. 3 in that the intermediate cation-exchange membrane 1 and the cation-exchange resin are both omitted. Specifically, the electric deionized water production apparatus 20C of the embodiment comprises an anode 10 disposed outside of the anion-exchange membrane 2 on one side and a cathode 9 disposed outside of the cation-exchange membrane 1 on the other side, a deionizing chamber 15 partitioned by the anion-exchange membrane 2 on one side and the cation-exchange membrane 1 on the other side, which is packed with an anion monolith 14, an anion-exchange resin 11, a cation monolith 13 in that order from the side of the anion-exchange membrane 2 on one side (anode side), wherein unprocessed water is supplied from an inlet port 3c near the anion-exchange membrane 2 on one side of the deionizing chamber 15 to obtain processed water from an outlet port 4c near the cation-exchange membrane 1 on the other side of the deionizing chamber 15. The water flows in the deionizing chamber 15 from left to right, as shown by the solid arrows in FIG. 4.

In the electric deionized water production apparatus 20C, the unprocessed water is introduced from the inlet port 3c near the anion-exchange membrane 2 of the anode 10 side of the deionizing chamber 15. Then, the unprocessed water moves to the cathode 9 side during which anions $Y^-$ are removed by adsorption in the anion monolith 14 and the anion-exchange resin 11, moves to the cathode 9 side anions during which cations $X^+$ are removed by adsorption in the cation monolith 13, and discharged from the outlet port 4c near the cation-exchange membrane 1 on the cathode 9 side of the deionizing chamber 15 as processed water. The same effect as that exhibited by the electric deionized water production apparatus 20B can be obtained using the electric deionized water production apparatus 20C. In addition, the apparatus can be downsized and simplified by omitting the intermediate cation-exchange membrane. In the case of the electric deionized water production apparatus 20C, anions $Y^-$ migrate in the direction opposite to the water flow direction and cations $X^+$ migrate in the same direction as the water flow.

In the electric deionized water production apparatus 20C, the configuration in which the mixed ion-exchange materials are packed in the deionizing chamber 15 includes a configuration in which an anion-exchange resin 11 and a cation monolith 13 are packed in that order from the anion-exchange membrane 2 on one side to the cation-exchange membrane 1 on the other side, and the like. Since the inlet port 3c is located in the anion-exchange resin phase in the above configuration, deflected flow in the deionizing chamber can be prevented. In the above and other configurations, the location of feeding the unprocessed water is not limited to the above-mentioned embodiment. A method of feeding the unprocessed water from the inlet port near the cation-exchange membrane 1 on the other side, causing the water to move to the anode 10 side while removing cations $X^+$ in the cation-exchange material, and further to the anode 10 side while removing anions $Y^-$ in the anion-exchange material, and discharging from the outlet port near the anion-exchange membrane 2 as processed water may be used. The packing ratio of the monolith and the ion-exchange resin in the deionzing chamber 15 can be arbitrarily determined according to the properties of the unprocessed water and the like. A preferable range of the ratio by volume of monolith:ion-exchange resin is from 1:0.5 to 1:10.

Applications and combinations applied to the general ion-exchange apparatus are also applicable to the electric deionized water production apparatus of the present invention. For example, the apparatus can be used as a softening apparatus by using only the decationizing chamber, or a mixed bed ion exchanger may be installed at the rear end to increase purity of the processed water.

EXAMPLES

The present invention will be described in more detail by examples, which should not be construed as limiting the present invention.

(Fabrication of Electric Decationized Water Production Apparatus)

Figure 5:
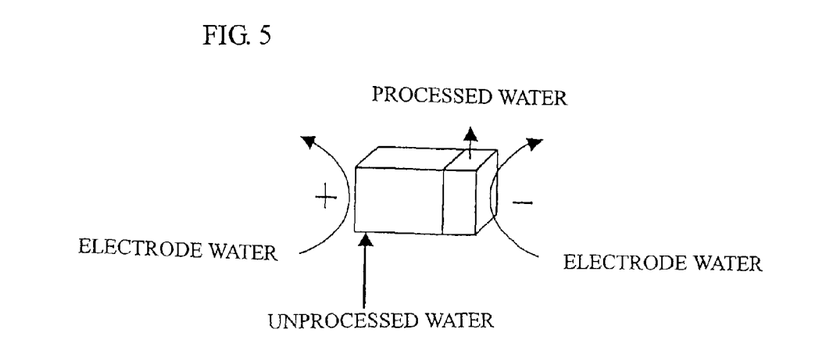
FIG. 5 is a schematic drawing of the electric decationized water-producing device used in the examples.

An electric deionized water-producing device shown in the schematic drawing of FIG. 5 was used. The specification of the device was as follows.

Cell size: 160 ml (length: 5 cm, width: 4 cm, height (distance length between electrodes): 8 cm)

Cell container: internal volume 160 ml

Anion-exchange resin (packed in the anode side): 120 ml (IRA402BL), length: 5 cm, width: 4 cm, height: 6 cm Cation monolith: monolith described in JP-A-2003-334560, cut into pieces of 5 cm×4 cm×2 cm Unprocessed water: water penetrated a reverse osmosis membrane penetration, conductivity: about 20 µS/cm, flow rate: 15 l/hour Electrode water: anode water and cathode water, each at a flow rate of 5 l/hour (Operation of Electric Deanionized Water Production Apparatus)

Unprocessed water was continuously supplied to the electric deionized water production apparatus at a flow rate of 15 l/hr (LV=7.5, SV=94 (whole)) applying a 0.33 A direct current. Processed water having a conductivity of 0.8 µS/cm was obtained at an operating voltage of 64V, demonstrating that high purity water can be produced by the electric deionized water production apparatus of the present invention. Inside of the container was observed during the continuous operation to confirm that the cation monolith is crushed due to expansion of the anion-exchange resin and the mixed ion-exchange material adhering to the container.

Industrial Applicability

The electric deionized water production apparatus of the present invention used in various industries such as the semiconductor manufacturing industry, the pharmaceutical industry, the food industry, power plants, and laboratories, as well as for the manufacture of sugar solutions, juice, wine, and the like.

The invention claimed is:

1. An electric deionized water production apparatus, comprising:
   a deionizing chamber to which a direct current field is applied, the deionizing chamber being packed with an ion-exchange material that allows ions to be discharged to migrate in a direction identical or opposite to a direction of water flow in the ion-exchange material, the ion-exchange material including a mixture of a monolith-shaped organic porous ion-exchange material and ion-exchange resin particles, the monolith-shaped organic porous ion-exchange material swelling or shrinking according to an ion exchange reaction,
   wherein ionic impurities adsorbed in the ion-exchange material are discharged from the electric deionized water production apparatus, and
   a physical elasticity of the monolith-shaped organic porous ion-exchange material maintains the packing of the deionization chamber independently of the swelling or shrinking according to the ion exchange reaction.

2. The electric deionized water production apparatus according to claim 1 comprising:
   an anion cell which has a deanionizing chamber partitioned by an anion-exchange membrane on one side and an ion-exchange membrane on the other side, an anode disposed outside of the anion-exchange membrane on one side, and a cathode disposed outside of the ion-exchange membrane on the other side, to supply unprocessed water from the neighborhood of the anion-exchange membrane on one side of the deanionizing chamber to obtain a first processed-water from the neighborhood of the ion-exchange membrane on the other side of the deanionizing chamber; and
   a cation cell which has a decationizing chamber partitioned by a cation-exchange membrane on one side and an ion-exchange membrane on the other side, a cathode disposed outside of the cation-exchange membrane on one side, and an anode disposed outside of the ion-exchange membrane on the other side, to supply the first-processed water from the neighborhood of the cation-exchange membrane on one side of the decationizing chamber to obtain a second processed-water from the neighborhood of the ion-exchange membrane on the other side of the decationizing chamber.

3. The electric deionized water production apparatus according to claim 2, wherein the ion-exchange material packed in the cathode side of the cation cell is a monolith-shaped organic porous cation-exchange material or the ion-exchange material packed in the anode side is a monolith-shaped organic porous anion-exchange material, and the ion-exchange material packed in the anode side of the above anion cell is a monolith-shaped organic porous anion-exchange material or the ion-exchange material packed in the cathode side is a monolith-shaped organic porous cation-exchange material.

4. The electric deionized water production apparatus according to claim 2, wherein the ion-exchange material packed in the cathode side of the cation cell is a monolith-shaped organic porous cation-exchange material or the ion-exchange material packed in the anode side is a monolith-shaped organic porous anion-exchange material, and the ion-exchange material packed in the anode side of the above anion cell is a monolith-shaped organic porous anion-exchange material or the ion-exchange material packed in the cathode side is a monolith-shaped organic porous cation-exchange material.

5. The electric deionized water production apparatus according to claim 1 comprising:
   a cation cell which has a decationizing chamber partitioned by a cation-exchange membrane on one side and an ion-exchange membrane on the other side, a cathode disposed outside of the cation-exchange membrane on one side, and an anode disposed outside of the ion-exchange membrane on the other side, to supply unprocessed water from the neighborhood of the cation-exchange membrane on one side of the decationizing chamber to obtain a first processed-water from the neighborhood of the ion-exchange membrane on the other side of the decationizing chamber; and
   an anion cell which has a deanionizing chamber partitioned by an anion-exchange membrane on one side and an ion-exchange membrane on the other side, an anode disposed outside of the anion-exchange membrane on one side, and a cathode disposed outside of the ion-exchange membrane on the other side, to supply the first-processed water from the neighborhood of the anion-exchange membrane on one side of the deanionizing chamber to obtain a second processed-water from the neighborhood of the ion-exchange membrane on the other side of the deanionizing chamber.

6. The electric deionized water production apparatus according to claim 1, provided with an intermediate ion-exchange membrane between the anion-exchange membrane on one side and the cation-exchange membrane on the other side, to form a deanionizing chamber partitioned by the anion-exchange membrane on one side and the intermediate ion-exchange membrane and a decationizing chamber partitioned by the cation-exchange membrane on the other side and the intermediate ion-exchange membrane, an anode being disposed outside of the anion-exchange membrane on one side and a cathode being disposed outside of the cation-exchange membrane on the other side, wherein unprocessed water is supplied from the neighborhood of the cation-exchange membrane on the other side of the decationizing chamber to obtain a first processed-water from the neighborhood of the intermediate ion-exchange membrane in the decationizing chamber, and the first processed-water is supplied from the neighborhood of the anion-exchange membrane on one side of the deanionizing chamber to obtain a second processed-water from the neighborhood of the intermediate ion-exchange membrane in the deanionizing chamber.

7. The electric deionized water production apparatus according to claim 6, wherein the ion-exchange material packed in the cathode side of the decationizing chamber is a monolith-shaped organic porous cation-exchange material or the ion-exchange material packed in the anode side of the deanionizing chamber is a monolith-shaped organic porous anion-exchange material.

8. The electric deionized water production apparatus according to claim 1, provided with an intermediate ion-exchange membrane between the cation-exchange membrane on one side and the anion-exchange membrane on the other side, to form a decationizing chamber partitioned by the cation-exchange membrane on one side and the intermediate ion-exchange membrane and a deanionizing chamber partitioned by the anion-exchange membrane on the other side and the intermediate ion-exchange membrane, and a cathode being disposed outside of the cation-exchange membrane on one side and an anode being disposed outside of the anion-exchange membrane on the other side, wherein unprocessed water is supplied from the neighborhood of the anion-exchange membrane on the other side of the deanionizing chamber to obtain a first processed-water from the neighborhood of the intermediate ion-exchange membrane in the deanionizing chamber, and the first processed-water is supplied from the neighborhood of the cation-exchange membrane on one side of the decationizing chamber to obtain a second processed-water from the neighborhood of the intermediate ion-exchange membrane in the decationizing chamber.

9. The electric deionized water production apparatus according to claim 8, wherein the ion-exchange material packed in the cathode side of the decationizing chamber is a monolith-shaped organic porous cation-exchange material or the ion-exchange material packed in the anode side of the deanionizing chamber is a monolith-shaped organic porous anion-exchange material.

10. The electric deionized water production apparatus according to claim 1, which has a deionizing chamber partitioned by an anion-exchange membrane on one side and a cation-exchange membrane on the other side, an anode disposed outside of the anion-exchange membrane on one side, and a cathode disposed outside of the cation-exchange membrane on the other side, the anode side of the deionizing chamber being packed with a monolith-shaped organic porous anion-exchange material, or the cathode side of the deionizing chamber being packed with a monolith-shaped organic porous cation-exchange material, wherein unprocessed water is supplied from the neighborhood of the anion-exchange membrane on one side of the deionizing chamber to obtain a processed water from the neighborhood of the cation-exchange membrane on the other side of the deionizing chamber, or from the neighborhood of the cation-exchange membrane on the other side of the deionizing chamber to obtain a processed water from the neighborhood of the anion-exchange membrane on one side of the deionizing chamber.

11. The electric deionized water production apparatus according to claim 1, further comprising:
a plurality of pipes embedded within the ion-exchange material at equal intervals to distribute unprocessed water within the ion-exchange material, each of the plurality of pipes including a plurality of pores through which the unprocessed water is distributed to the ion-exchange material.

12. The electric deionized water production apparatus according to claim 1, further comprising:
a plurality of equally spaced grooves within the ion-exchange material at equal intervals to distribute unprocessed water within the ion-exchange material.

13. The electric deionized water production apparatus according to claim 1, wherein the physical elasticity of the monolith-shaped organic porous ion-exchange material maintains an equal packing of the monolith-shaped organic porous ion-exchange material within the deionizing chamber when the monolith-shaped organic porous ion-exchange material swells or shrinks in response to the ion-exchange reaction.

14. The electric deionized water production apparatus according to claim 1, wherein the monolith-shaped organic porous ion-exchange material includes interconnected macropores and mesopores in walls of the marcopores, the mesopores having an average diameter between 1 and 1000 micrometers.

* * * * *